United States Patent
Vogel et al.

(10) Patent No.: US 10,633,520 B2
(45) Date of Patent: Apr. 28, 2020

(54) DRY LIQUID

(75) Inventors: Roland Vogel, Dresden (DE); Marijan Vucak, Altendiez (DE); Christoph Nover, Rheinberg (DE)

(73) Assignee: Schaefer Kalk GmbH & Co. KG, Diez (DE)

( * ) Notice: Subject to any disclaimer, the term of this patent is extended or adjusted under 35 U.S.C. 154(b) by 0 days.

(21) Appl. No.: 13/811,663

(22) PCT Filed: Jul. 28, 2011

(86) PCT No.: PCT/EP2011/003774
§ 371 (c)(1),
(2), (4) Date: Jan. 22, 2013

(87) PCT Pub. No.: WO2012/019711
PCT Pub. Date: Feb. 16, 2012

(65) Prior Publication Data
US 2013/0122304 A1    May 16, 2013

(30) Foreign Application Priority Data

Jul. 30, 2010 (EP) .................. 10007960

(51) Int. Cl.
*C08K 9/12* (2006.01)
*C09C 1/02* (2006.01)

(52) U.S. Cl.
CPC .............. *C08K 9/12* (2013.01); *C09C 1/021* (2013.01); *C01P 2004/20* (2013.01); *C01P 2004/61* (2013.01); *C01P 2004/62* (2013.01); *C01P 2006/11* (2013.01); *C01P 2006/12* (2013.01); *C01P 2006/14* (2013.01); *C01P 2006/19* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 3,133,824 A | * | 5/1964 | Podschus | C09C 1/021 106/464 |
| 5,007,964 A | * | 4/1991 | Tsukisaka et al. | 106/464 |
| 5,210,281 A | | 5/1993 | Ritter et al. | |
| 5,292,495 A | * | 3/1994 | Nakajima | C01F 11/185 264/42 |
| 5,939,091 A | * | 8/1999 | Eoga et al. | 424/441 |
| 6,759,462 B2 | | 7/2004 | Fitzgerald | |
| 6,924,320 B2 | | 8/2005 | Morriston | |
| 2002/0099142 A1 | | 7/2002 | Faulkner | |
| 2003/0082091 A1 | * | 5/2003 | Jasra et al. | 423/432 |
| 2003/0230376 A1 | | 12/2003 | Smith et al. | |
| 2004/0054055 A1 | | 3/2004 | Fukushi et al. | |
| 2005/0233074 A1 | * | 10/2005 | Dalziel et al. | 427/212 |
| 2007/0141941 A1 | | 6/2007 | DeLucia et al. | |
| 2007/0237972 A1 | | 10/2007 | Kliesch et al. | |
| 2007/0238816 A1 | | 10/2007 | Kliesch et al. | |
| 2009/0202835 A1 | | 8/2009 | Pitsch et al. | |

FOREIGN PATENT DOCUMENTS

| | | | | |
|---|---|---|---|---|
| EP | 0376089 A1 | | 7/1990 | |
| EP | 0 386 868 | * | 9/1990 | ............ C01F 11/185 |
| EP | 1 151 966 | * | 11/2001 | ............ C01F 11/181 |
| EP | 1787957 A1 | | 5/2007 | |
| EP | 1787958 A1 | | 5/2007 | |
| EP | 1842662 A1 | | 10/2007 | |
| EP | 1842871 A1 | | 10/2007 | |
| EP | 2 168 572 A1 | * | 3/2010 | ............... A61K 9/14 |

OTHER PUBLICATIONS

Material Data Safety Sheet SILQUEST PA-1. Momentive. Version: 1.1. Dec. 6, 2012.*
Machine translation of Schaefer et al. (EP 1 151 966 A1). Nov. 7, 2001.*
"Absolute, Dynamic and Kinematic Viscosity" The Engineering ToolBox, Feb. 9, 2006, http://www.engineeringtoolbox.com/dynamic-absolute-kinematic-viscosity-d_412.html. Accessed Nov. 13, 2016.*
Bearce, H.W. "No. 9 Density and Thermal Exapnsion of Linseed Oil and Turpentine" Technologic Papers of the Bureau of Standards. Washington Government Printing Office. Apr. 15, 1912.*
Abbas et al., "New Method for Post-Processing Crosslinking Reaction," *European Polymer Journal*, 44(5):1238-1246 (2008).
Römpp Chemie-Lexikon, pp. 2277-2278 (crystal morphology).
Römpp Chemie-Lexikon, pp. 3976-3978 (melting point).
Römpp Chemie-Lexikon, pp. 4084-4085 (boiling point).
Shi et al., "Nano-Reactors for Controlling the Selectivity of the Free Radical Grafting of Maleic Anhydride Onto Polypropylene in the Melt," *Polymer Engineering and Science*, 46(10):1443-1454 (2006).
R.T. Vanderbilt Co., Inc., "Varox Peroxide Brochure—Crosslinking Agents for the Rubber & Plastics Industries," www.rtvanderbilt.com. (2010).
R.T. Vanderbilt Co., Inc., Comprehensive Varox Peroxide Accelerator Product Guide,: www.rtvanderbilt.com (2010).
Natrochem, Inc., "Material Safety Data Sheet Sil EF189 DLC," www.natrochem.com/msds.htm (2007).
Natrochem, Inc., "Material Safety Data Sheets DLC—Dry Liquid Concentrate," www.natrochem.com/msds.htm (2004).
International Search Report for PCT/EP2011/003774 dated Jan. 18, 2012.

* cited by examiner

*Primary Examiner* — Elizabeth A Robinson
*Assistant Examiner* — Thomas A Mangohig
(74) *Attorney, Agent, or Firm* — Marshall, Gerstein & Borun LLP

(57) ABSTRACT

A dry liquid, comprising at least one additive having a molar mass greater than 20 g/mol, a melting temperature less than 500° C., and a boiling point, measured at 101325 Pa, greater than 100° C. and at least one calcium carbonate as a carrier material, wherein the calcium carbonate is precipitated calcium carbonate. The dry liquid is suitable in particular for introducing at least one preferably fluid additive into a chemical composition.

16 Claims, No Drawings ns: # DRY LIQUID

BACKGROUND OF THE INVENTION

Field of the Invention

The present invention relates to a dry liquid comprising calcium carbonate as the carrier material, a production method therefor and use thereof.

Related Technology

Dry liquids are known substances, and for the purpose of the present invention they designate target substances, particularly liquids, that are placed on or in a mineral or organic carrier material and are then available as a free flowing powder. Dry liquids are used in the rubber industry in powder coatings, in cement mixtures, adhesives, foodstuffs, medications and the chemical industry.

With this technology, for example, liquid silanes can be converted into a powder.

The rubber and chemical industries make use of very many different active liquids, including for example process oils, catalysts, crosslinking agents, plasticizers, flame retardants and liquid plastics.

Many of these target substances present handling difficulties. Low-viscosity liquids are particularly difficult to mix with high-viscosity melts of thermoplastics or elastomers. It is very difficult to isolate exact quantities of high-viscosity liquids or strongly adhesive liquids or solids with low melting point for chemical processes.

In the context of the present invention, the target substances that are deposited on the carrier material will be referred to as additives.

Processes of this nature are rendered considerably simpler by converting the physical state of these additives into a 'dry liquid' state. Handling is easier, dry liquids can usually be mixed faster, distribution is more uniform and process times are shorter.

The most widely used carrier materials for dry liquids are silica gel and silicates, and the fraction of preferably fluid additives is preferably in a range up to 70-75% relative to the carrier material. Other carrier materials are known, but are used less often.

Dry liquids based on various carrier materials have also been described in the technical literature.

The use of spherical polyamides with an average diameter of 5 μm, aerosols with a diameter of 12 nm and crosslinked polystyrene-co-divinylbenzene particles with a diameter of 8 μm is described as a carrier material for 1,4-butanediol in the publication by L. Abbas, M. Bouquey, J. J. Flat, R. Muller, "New method for post-processing crosslinking reaction" European Polymer Journal 44 (2008) 5, 1238-1246.

In the article by D. Shi, R. K. Y. Li, Y. T. Zhu, Z. Ke, J. H. Yin, W. Jiang et al., "Nano-reactors for controlling the selectivity of the free radical grafting of maleic anhydride onto propylene in the melt", Polymer Engineering and Science 46 (2006) 10, 1443-1454, two different montmorillonites are used as the carrier material for dry liquids.

U.S. Pat. No. 6,924,320 relates to vulcanizable thermoplastic elastomers. This document describes the production of a dry liquid consisting of at least 40% by weight polypropylene copolymer, at least 10% by weight Santoprene™, at least 11% by weight LDPE, at least 0.5% by weight oil, at least 0.5% by weight of a mixture of saturated and unsaturated fatty acids with organic acid modifications, at least 0.5% by weight silicon and at least 20% by weight dry rubber flour.

U.S. Pat. No. 6,759,462 discloses the manufacture of dry liquids using calcium carbonate as the carrier material. With this carrier material, a coating mixture that is dispersible in water is prepared. The dry liquid in this invention contains 4-11% polymer binding agent, 0.6-1.5% thickener and 0.1-0.35% surfactant relative to the weight of the carrier material. However, the document discloses no further details about the calcium carbonate.

Patent application EP 0 376 089A1 claims a process for preparation in the pure state of essentially neutral, semi-volatile and reactive, olefinic compounds having double bonds using feedstock materials that contain these components together with less significant quantities of acidic reaction participants and/or corresponding auxiliary materials in the liquid phase, by neutralizing or separating the salts formed, wherein in order to obtain products in the pure state, which combine low radical acid numbers and low color numbers, even without distillation the neutralization is carried out with solid, fine-powdered oxides, carbonate and/or hydroxides of alkali and/or alkaline earth metals, if desired together with other insoluble basic metal oxide compounds as dry neutralizing agents, and subsequently separating the organic liquid phase from the fine-powdered solid phase.

The applications EP 1 787 957 A1 and EP 1 787 958 A1 describe dry liquids with a carrier material of hydrophobic, pyrogenically produced silicic acid having a single droplet size smaller than 5 μm. The dry liquid is produced by mixing intensively with the fluid additive.

Application EP 1 842 871 A1 describes a polyester film that contains a hydrolysis stabilizer. This hydrolysis stabilizer is an epoxy alkyl ester of fatty acids or a mixture of fatty acids and glycerides. A silicate is used as the carrier material.

EP 1 842 662 A1 describes formulations that are comparable to those of application EP 1 842 871 A1 for producing dry liquids with a hydrolysis stabilizer as the fluid additive. In this case, the dry liquid is used for hydrolysis stabilization of multilayer polyester films.

In the past, dry liquids have been produced from a mineral or organic carrier material that has a spherical or sphere-like geometry. This geometry results in an unfavorable surface area/volume ratio of the carrier material. As a consequence, only a limited quantity of the additive, particularly a liquid, can be added relative to the carrier material. But since the additive must be added in a defined quantity for the purposes of the dry liquid application, it is necessary to use a relatively high proportion of carrier material for the manufacturing process.

DESCRIPTION OF THE INVENTION

The object of the present invention was therefore to suggest improved options for introducing additives, preferably liquids, and particularly for achieving a reduction in the quantity of the carrier material to be used relative to the required quantity of additive.

The object of the invention consists particularly in suggesting options that enable additives, particularly fluid additives, to be added relatively easily and efficiently to chemical compounds, particularly polymer compounds, also in larger quantities.

In so doing, it was desired to obtain the most uniform distribution possible of the preferably fluid additive in the chemical compound, particularly in the polymer compound, which should preferably be achieved as rapidly as possible.

Finally, ways were also sought to distribute the preferably fluid additive in the chemical compound as far as possible without any chemical side reactions or premature reactions, particularly in the polymer compound, in order to be able to activate it in targeted manner at a later time.

By Providing a Dry Liquid that Contains a. at least one, preferably fluid, additive having a molar mass greater than 20 g/mol, a melting temperature lower than 500° C. and a boiling temperature, measured at 101325 Pa, higher than 100° C., and b. at least one calcium carbonate as the carrier material, wherein the calcium carbonate is a precipitated calcium carbonate, it is possible, in a manner not easily predictable, to demonstrate a better option for introducing additives, particularly fluid additives, and at the same time to achieve a reduction in the quantity of carrier material to be used relative to the required quantity of additive. The dry liquid according to the invention also has a relatively low bulk density and flows particularly well.

The present invention particularly enables preferably fluid additives, even relatively large quantities thereof, to be added to a chemical compound, particularly a polymer compound, accurately, simply, and extremely efficiently. In so doing, due to its relatively small dry liquid particles the preferably fluid additive is able to distributed extremely homogeneously throughout the chemical compound, particularly the polymer compound.

The relatively small distance between the dry liquid particles in the compound, particularly in the plastic matrix, shortens the necessary diffusion paths for the preferably fluid additive, so that exceptionally even distribution of the additive may be achieved in the chemical compound, particularly in the plastic matrix. Essential process times are shortened considerably thereby.

Finally, the preferably fluid additive may be distributed throughout the chemical compound, particularly the polymer compound, with relatively little disturbance. In this way, possible chemical side reactions and/or premature reactions involving the additive are avoided in the best manner possible, which in turn allows the additive to be activated in the chemical compound deliberately at a later time.

The object of the present invention is a dry liquid containing a. at least one preferably fluid additive, b. at least one calcium carbonate as the carrier material.

According to the invention, the molar mass of the preferably fluid additive is greater than 20 g/mol, preferably greater than 25 g/mol, more preferably greater than 50 g/mol, particularly preferably greater than 75 g/mol, recommendably at least 90 g/mol, especially at least 100 g/mol.

Within the context of the present invention, the melting temperature of the preferably fluid additive is lower than 500° C., favorably lower than 300° C., suitably lower than 100° C., preferably lower than 90° C., more preferably lower than 80° C., particularly preferably lower than 70° C., recommendably lower than 50° C., especially lower than 25° C.

In this context, the melting temperature of a substance refers to the temperature at which the liquid and solid phases of the substance are in thermodynamic equilibrium normally under pressure of 1013 hPa. For further details, reference is made to the technical literature, particularly Römpp-Lexikon Chemie/Published by Jürgen Falbe; Manfred Regitz. edited by Eckard Amelingmeier; Stuttgart, N.Y.; Thieme; Volume 5; 10th edition (1999); keyword "Melting point" and the information sources listed therein.

According to the invention, the boiling temperature of the preferably fluid additive is higher than 100° C., preferably higher than 125° C., more preferably higher than 150° C., particularly preferably higher than 175° C., recommendably at least 190° C., especially at least 200° C.

In this context, the boiling temperature of a substance refers to the temperature at which the liquid and gas phases of the substance are in thermodynamic equilibrium. In the present case this is measured under 101325 Pa pressure. For further details, reference is made to the technical literature, particularly Römpp-Lexikon Chemie/Published by Jürgen Falbe; Manfred Regitz. edited by Eckard Amelingmeier; Stuttgart, N.Y.; Thieme; Volume 5; 10th edition (1999); keyword "Boiling point" and the information sources listed therein.

For the purposes of the present invention, the preferably fluid additive ideally has a dynamic viscosity, measured at 25° C. and with a shear rate of 100 Hz, less than $10^6$ mPas, preferably less than $10^4$ mPas, particularly less than $10^3$ mPas, recommendably less than $10^2$ mPas, especially less than 10 mPas.

On the other hand, the dynamic viscosity of the dry liquid, measured at 25° C. and with a shear rate of 100 Hz, is preferably more than $10^5$ mPas, more preferably more than $10^6$ mPas, particularly preferably more than $10^9$ mPas, recommendably more than $10^{12}$ mPas, especially more than $10^{15}$ mPas.

In the context of the present invention, the calcium carbonate consists of precipitated calcium carbonate particles (PCC).

The specific surface area of the calcium carbonate is preferably greater than 3.0 $m^2/g$, more preferably greater than 5.0 $m^2/g$, particularly preferably greater than 10.0 $m^2/g$, recommendably greater than 15.0 $m^2/g$, especially greater than 17.0 $m^2/g$, and in the context of a particularly preferred embodiment of the present invention the specific surface area is in the range from greater than 3.0 $m^2/g$ to 20.0 $m^2/g$.

The total intrusion volume of the calcium carbonate is preferably greater than 1.0 $cm^3/g$, more preferably greater than 1.5 $cm^3/g$, particularly preferably greater than 2.0 $cm^3/g$, ideally greater than 2.5 $cm^3/g$, especially greater than 2.7 $cm^3/g$. It is preferably determined by mercury porosimetry, particularly preferably in accordance with DIN 66133, especially using a Quantachrome PoreMaster 60-GT.

The $d_{50\%}$ particle size of the calcium carbonate is preferably larger than 0.2 μm, more preferably larger than 0.5 μm, particularly at least 1.0 μm and in the context of a particularly preferred embodiment of the present invention is in the range larger 0.2 μm to 2.0 μm.

For the purposes of the present invention, the particle size is preferably determined by sedimentation analysis, ideally using the SediGraph 5100 (Micromeritics GmbH).

The oil number of the calcium carbonate is preferably greater than 25 g/100 g calcium carbonate, more preferably greater than 40 g/100 g calcium carbonate, particularly preferably greater than 50 g/100 g calcium carbonate, recommendably at least 60 g/100 g calcium carbonate, most preferably at least 70 g/100 g calcium carbonate, especially at least 75 g/100 g calcium carbonate. It is preferably determined on the basis of DIN ISO 787-5:1995-10.

The tapped density of the calcium carbonate is preferably less than 1.0 g/ml, more preferably less than 0.8 g/ml, particularly preferably less than 0.5 g/ml, ideally less than 0.4 g/ml, especially not more than 0.3 g/ml. It is preferably determined on the basis of DIN ISO 787-11.

For the purposes of the present invention, the dry liquid preferably contains calcitic calcium carbonate. In the context of a particularly preferred embodiment of the present invention, the fraction of crystalline calcium carbonate, particularly calcitic calcium carbonate, is relatively high, and preferably greater than 10% by weight, more preferably greater than 25% by weight, favorably greater than 50% by weight, particularly preferably greater than 70% by weight, most preferably greater than 80% by weight, especially preferably greater than 90% by weight, relative to the total weight of the calcium carbonate in each case.

For determining crystalline fractions, X-ray diffraction, preferably with an internal standard, preferably aluminum oxide in conjunction with a Rietveld refinement, has proven highly satisfactory.

In addition, scalenohedral, rhombohedral and plate-like, preferably rhombohedral and plate-like, and particularly plate-like calcium carbonate particles have proven especially suitable for the purposes of the present invention. In this context, particularly preferred platelets have a ratio of particle length to particle thickness greater than 5:1, preferably greater than 8:1, particularly greater than 10:1 and a ratio of particle width to particle thickness greater than 5:1, preferably greater than 8:1, particularly greater than 10:1.

For further details about the terms used in crystal morphology, readers are referred to Römpp-Lexikon Chemie/ Published by Jürgen Falbe; Manfred Regitz. edited by Eckard Amelingmeier; Stuttgart, N.Y.; Thieme; Volume 3; 10th edition (1997); keyword "Crystal morphology" and the information sources listed therein.

In principle, the relative fractions of the dry liquid are freely selectable. However, dry liquids containing, relative to the total weight thereof, a. 10.0% by weight to 90.0% by weight, preferably 20.0% by weight to 80.0% by weight, particularly preferably 25.0% by weight to 75.0% by weight, especially 30.0% by weight to 70.0% by weight of at least one preferably fluid additive, and b. 90.0% by weight to 10.0% by weight, preferably 80.0% by weight to 20.0% by weight, particularly preferably 75.0% by weight to 25.0% by weight, especially 70.0% by weight to 30.0% by weight of at least one calcium carbonate, wherein the sum of the fractions of the additive and the calcium carbonate is equal to preferably at least 75.0% by weight, more preferably at least 90.0% by weight, particularly preferably at least 95.0% by weight, recommendably at least 99.0% by weight, especially 100.0% by weight have proven particularly effective. Additives that are particularly well suited to the purposes of the present invention include liquid silanes, process oils, catalysts, crosslinking agents, plasticizers, flame retardants and liquid plastics, which may or may not contain further additives, preferably in quantities of up to 25.0% by weight, particularly preferably in quantities of up to 10.0% by weight, especially in quantities of up to 5.0% by weight, relative to the total weight of the additive in each case.

The dry liquid may be prepared in known manner, by mixing the components together. However, a method has proven particularly effective in which i. the preferably fluid additive is dissolved in a solvent, preferably an organic solvent having a boiling temperature lower than 100° C., particularly methanol, ethanol, n-propanol, iso-propanol, diethylether, acetone and/or tetrahydrofuran, ii. the solution from step i. is mixed with the calcium carbonate, and iii. the solvent is removed, preferably by raising the temperature and/or applying reduced pressure.

In this process, it is advisable to ensure that the components are thoroughly mixed, particularly before the solvent is removed.

As part of a further particularly preferred process of the present invention, the components are mixed directly, without the use of solvents or other additives, which must be removed from the final product again. In this connection, the use of heater cooler mixers has proven to be most advantageous.

Possible application areas of the dry liquid according to the invention will be immediately obvious so a person skilled in the art. It is particularly well suited for introducing at least one preferably fluid additive into a chemical compound, particularly a plastic compound.

Under these circumstances, it is very beneficial that the dry liquid is able to be handled comparatively simply, due to the fact that dry liquids are fairly cohesionless and flow freely when poured, even if the additive is relatively cohesive and sticky, and therefore difficult to manipulate.

The dry liquid preferably has very low adhesion.

The pourability of the dry liquid is preferably characterized by a bulk density less than 0.5 $g/cm^3$ of the uncompacted dry liquid according to DIN ISO 697 and EN ISO 60.

The invention is applicable for example in areas of the plastics industry. In particular, semi-crystalline polymers or elastomers may be mixed with the dry liquids on which the invention is based during the treatment process. After treatment, the preferably fluid additive diffuses out of the carrier material and spreads throughout the plastic matrix. Since only very little additive diffuses into the plastic matrix during the short treatment period in the melted state, chemical reactions between additive and the plastic matrix during the treatment process may be avoided almost entirely. This is a significant advantage for example for the melt spinning process for manufacturing crosslinked polymer fibres and hollow polymer filaments. Partial crosslinking of the polymer before the actual spinning process prevents the occurrence of melt spinning, since the deformation of the material necessary for this is not possible in the process. As far as possible, therefore, crosslinking should therefore not be carried out until after the actual spinning process.

Chemical reactions in the chemical compound, particularly between the plastic matrix and the additive may be initiated by appropriate activation of the diffused additive, for example by adding water or other chemicals, applying heat, UV irradiation or electron irradiation. These chemical reactions may be used in particular to produce branching and crosslinking.

The diffused additive may also server to modify the mechanical, physical and chemical properties of the chemical compound, particularly the plastic matrix. Plasticizers and liquid stabilizers may be cited as examples of preferably fluid additives that lend themselves particularly well to producing these effects.

In the following, the invention will be illustrated on the basis of a number of examples, without limitation of the inventive thought thereby.

The properties of the calcium carbonate materials used are summarized in Table 1.

TABLE 1

|  | PCC 1 | PCC 2 | PCC 3 | PCC 4 |
|---|---|---|---|---|
| Crystal modification (X-ray diffraction) | Calcite, scalenohedral | Calcite, scalenohedral | Calcite, rhombohedral | Calcite, plate-like |
| Tapped density [g/ml] (DIN EN ISO 787-11) | 0.5 | 0.7 | 0.3 | 0.3 |
| BET specific surface area [m²/g] | 8.7 | 5.3 | 34.0 | 17.2 |
| $d_{50\%}$ particle size [μm] (Sedigraph) | 1.0 | 3.3 | 0.7 | 1.0 |
| Oil number [g/100 g dry liquid] | 41 | 42 | 60 | 78 |
| Total intrusion volume [cm³/g] (mercury porosimetry)[1] | 1.8 | 1.3 | 2.5 | 2.8 |

[1]DIN 66133; Quantachrome PoreMaster 60-GT

Example 1

Dry liquids A to D were prepared using the calcium carbonate materials described. 1,4-butanediol was used as the fluid additive. 1.2 g 1,4-butanediol was dissolved in 5 ml tetrahydrofuran. 1.2 g calcium carbonate was then dispersed in this solution by intensive stirring. The solvent tetrahydrofuran was evaporated by storage for 24 hours at room temperature. The powder was then dried for 15 min at 130° C.

A finely dispersed, readily flowable powder with the following properties was obtained:
Dry liquid A
calcium carbonate: PCC 1
relatively low bulk volume
relatively large quantity of residual 1,4-butanediol
sticky
Overall evaluation: adequate
Dry liquid B
calcium carbonate: PCC 2
slightly better (larger) bulk volume than with dry liquid A
slightly less 1,4-butanediol residue than with dry liquid A
slightly less sticky than dry liquid A
Overall evaluation: barely satisfactory
Dry liquid C
calcium carbonate: PCC 3
bulk volume significantly better than with dry liquid B
almost no 1,4-butanediol residue; significantly better than with dry liquid B
significantly less sticky than dry liquid B
Overall evaluation: almost good
Dry liquid D
calcium carbonate: PCC 4
very high bulk volume; approximately double the bulk volume of dry liquid A
no 1,4-butanediol residue
only minimal adhesion of the primary particles
Overall evaluation: very good Example 2

The dry liquids from example 1 were mixed for 4 minutes at 110° C. and 50 revolutions per minute in a microcompounder according to the following formulation.

Formulation:
4 g Lotader 8200 polymer, produced by ARKEMA (terpolymer of ethylene (E), ethyl acrylate (EA) and maleic anhydride (MAH))
0.096 g dry liquid
0.008 g catalyst (p-toluenesulphonic acid (monohydrate))
All four powders were mixed together without difficulty. With dry liquid D, a completely white polymer was obtained (best product).

Once prepared, the mixtures were spun in a piston spinning machine at 110° C. with a take-off speed of 200 m/min. After tempering for 10 days at 40° C., the gel content of the fibres was determined by heat extraction. The fibre sample had a gel content of 47%. Crosslinking was also demonstrated with ATR-FTIR measurements. Rheological measurements also clearly showed a significant change in the mechanical properties due to crosslinking.

The starter polymer used did not yield a higher gel content even with other crosslinking processes. It may therefore be concluded that maximum crosslinking was achieved due to the use of the dry liquids.

Example 3

A dry liquid E was prepared using PCC 4. Di-trimethylolpropane tetraacrylate (DTMPTA), Ebecryl 140, manufactured by Cytec, was used as the fluid additive. 2 g Ebecryl 140 were dissolved in 5.5 ml tetrahydrofuran. 1.2 g PCC 4 was then dispersed in this solution by intensive stirring. The solvent tetrahydrofuran was evaporated by storing at room temperature for 24 hours. The powder was then dried for 15 min at 130° C. A finely dispersed, readily flowable powder was obtained.

The bulk volume of the resulting powder was twice that of other precipitated calcium carbonate materials (PCC 1, PCC 2, PCC 3). Consequently, the use of PCC 4 for dry liquid E results in a powder having minimal adhesion of the primary particles.

Example 4

The dry liquid from example 3 was mixed for 5 minutes at 190° C. and 80 revolutions per minute in a microcompounder according to the following formulation.

Formulation:
3 g mPE polymer Engage 8200, manufactured by Dupont (metallocene polyethylene with elastomer properties)
0.15 g dry liquid E
Once prepared, the mixture was spun in a piston spinning machine at 240° C. with a take-off speed of 250 m/min. The spun fibres were irradiated with a standard UV lamp to activate the radiation crosslinking agent Ebecryl 140.

Then, the gel content of the fibres was determined by heat extraction. The fibre sample had a gel content of 64%. Crosslinking was also demonstrated with rheological measurements.

The starter polymer used did not yield a higher gel content even with other crosslinking processes. It may therefore be concluded that optimal crosslinking was achieved with the use of dry liquid E.

Example 5

A dry liquid F was prepared using PCC 4. Phenylethylene (styrene) and methacryloxypropyltrimethoxysilane (VMMS) were used as the fluid additive. The solid benzoyl peroxide (BPO) should also be applied to the carrier PCC 4. 0.36 g BPO, 1 g VMMS and 0.12 g styrene were dissolved in 7 g acetone. 1.5 g PCC 4 was then dispersed into this solution by intensive stirring. The solvent acetone was evaporated by storing at room temperature for 24 hours. The powder was then dried for 15 min at 130° C. A finely dispersed, readily flowable powder was obtained.

The bulk volume of the resulting powder was twice that of other precipitated calcium carbonate materials (PCC 1, PCC 2, PCC 3). Consequently, the use of PCC 4 for dry liquid F results in a powder having minimal adhesion of the primary particles.

Example 6

The dry liquid from example 5 was mixed for 4 minutes at 215° C. and 75 revolutions per minute in a microcompounder according to the following formulation. Following storage in a water bath for three days, this sample was examined with using FTIR. This enabled the presence of Si—O—Si to be confirmed as proof that silane crosslinking had taken place.

Examples 7 and 8

Two further dry liquids were produced with PCC 4.

The crosslinking agents TAC (triallyl isocyanurate) or DTMPTA and a photoinitiator (4-chlorobenzophenone) were dissolved or diluted in 10 ml ethanol.

PCC 4 was then dispersed and stirred intensively into this solution.

After 24 h at room temperature, the solvent (ethanol) had evaporated.

The exact formulations are summarized in Table 2.

TABLE 2

| | PCC 4 [g] | TAC [g] | DTMPTA [g] | Photoinitiator [g] | Ethanol [ml] |
|---|---|---|---|---|---|
| dry liquid G | 2 g | 0.5 | | 0.5 | 10 |
| dry liquid H | 2 g | | 0.5 | 0.5 | 10 |

Examples 9 to 13

Mixtures of the dry liquids and the comparison samples with the metallocene polyethylene were prepared in the microcompounder (130° C., 5 min after melting, 80 rpm). The exact compositions of the samples examined are summarized in Table 3.

TABLE 3

| Example | mPE [g] | TAC [g] | DTMPTA [g] | dry liquid G [g] | dry liquid H [g] | Photoinitiator [g] |
|---|---|---|---|---|---|---|
| 9 | 3.5 | | | | | |
| 10 | 3.5 | 0.07 | | | | 0.07 |
| 11 | 3.5 | | 0.07 | | | 0.07 |
| 12 | 3.5 | | | 0.42 | | |
| 13 | 3.5 | | | | 0.42 | |

The samples were pressed to form foils and irradiated with a UV lamp for 5 min each.

Rheological tests were conducted at 120° C. on all five samples and show clear crosslinking of the samples with the photoinitiator. The results observed are summarized in tables 4 and 5.

TABLE 4

Storage module G' of the crosslinked polymer samples at 120° C. depending on frequency $\overline{\omega}$

| $\overline{\omega}$ [rad/s] | Example 9 [Pa] | Example 10 [Pa] | Example 11 [Pa] | Example 12 [Pa] | Example 13 [Pa] |
|---|---|---|---|---|---|
| 0.1 | 16736 | 26698 | 31400 | 28629 | 43091 |
| 0.15849 | 16051 | 23733 | 28735 | 26338 | 38459 |
| 0.25119 | 15214 | 20899 | 26332 | 23917 | 33880 |
| 0.39811 | 14389 | 18426 | 23869 | 21568 | 29713 |
| 0.63096 | 13533 | 16368 | 21207 | 19376 | 25935 |
| 1 | 12606 | 14534 | 18777 | 17277 | 22572 |
| 1.5849 | 11638 | 12931 | 16582 | 15296 | 19583 |
| 2.5119 | 10624 | 11434 | 14515 | 13431 | 16849 |
| 3.9811 | 9550.4 | 9986.9 | 12561 | 11669 | 14378 |
| 6.3096 | 8451.1 | 8618.7 | 10734 | 10023 | 12064 |
| 10 | 7335.7 | 7313.5 | 9045.9 | 8491.3 | 9750.3 |
| 15.849 | 6229.4 | 6047.1 | 7492.1 | 7061.7 | 7703.2 |
| 25.119 | 5150.1 | 4774.6 | 6050.8 | 5692.4 | 5880 |
| 39.811 | 4105.5 | 3458.4 | 4757.9 | 4401.3 | 4351.8 |
| 63.096 | 3113.7 | 2299.6 | 3628 | 3092.9 | 2906.7 |
| 100 | 2147.8 | 1315.4 | 2613.6 | 1626.6 | 1625.2 |

TABLE 5 tan δ = G''/G' of the crosslinked polymer samples at 120° C. depending on frequency $\overline{\omega}$

| $\overline{\omega}$ [rad/s] | Example 9 | Example 10 | Example 11 | Example 12 | Example 13 |
|---|---|---|---|---|---|
| 0.1 | 8.6632 | 1.8407 | 2.2605 | 2.3804 | 1.7619 |
| 0.15849 | 6.4293 | 1.9459 | 2.3248 | 2.4576 | 1.8333 |
| 0.25119 | 5.4446 | 2.0749 | 2.3249 | 2.4388 | 1.8564 |
| 0.39811 | 4.6082 | 2.1226 | 2.2205 | 2.3644 | 1.841 |
| 0.63096 | 3.9051 | 2.1268 | 2.1427 | 2.2623 | 1.8 |
| 1 | 3.349 | 2.098 | 2.0358 | 2.1495 | 1.7522 |
| 1.5849 | 2.8975 | 2.041 | 1.9292 | 2.0291 | 1.6951 |
| 2.5119 | 2.5341 | 1.9429 | 1.8109 | 1.8951 | 1.6209 |
| 3.9811 | 2.2153 | 1.8145 | 1.6741 | 1.748 | 1.5241 |
| 6.3096 | 1.9195 | 1.6545 | 1.5274 | 1.5855 | 1.4053 |
| 10 | 1.6475 | 1.477 | 1.3673 | 1.4143 | 1.2676 |
| 15.849 | 1.3986 | 1.2867 | 1.2008 | 1.2369 | 1.1183 |
| 25.119 | 1.1688 | 1.0958 | 1.0302 | 1.0542 | 0.9638 |
| 39.811 | 0.95267 | 0.9009 | 0.856 | 0.86933 | 0.80643 |
| 63.096 | 0.74059 | 0.70597 | 0.67379 | 0.68005 | 0.63821 |
| 100 | 0.52136 | 0.50172 | 0.47499 | 0.47626 | 0.45385 |

The dry liquids produced are highly suitable for producing samples for UV crosslinking.

There is no significant difference between the samples in which the reagents were mixed in directly and the samples in which the reagents were used as dry liquids.

Example 14

A dry liquid 1 was prepared with PCC 4. DTMPTA Ebecryl 140, manufactured by Cytec, was used as the fluid additive. The photoinitiator 4-chlorobenzophenone, which is solid at room temperature, was also used. 1 g Ebecryl 140 and 1 g 4-chlorobenzophenone were dissolved in 6 ml ethanol. 2 g PCC 4 were then dispersed in this solution by intensive stirring. The solvent ethanol was evaporated by storing at room temperature for 24 hours. A finely dispersed, readily flowable powder was obtained.

The bulk volume of the resulting powder was twice that of other precipitated calcium carbonate materials (PCC 1, PCC 2, PCC 3). Consequently, the use of PCC 4 for dry liquid 1 results in a powder having minimal adhesion of the primary particles.

Example 15

The dry liquid 1 was mixed for 4 minutes at 130° C. and 70 revolutions per minute in a microcompounder according to the following formulation.

Formulation:
3 g Polymer mPE Engage 8200, manufacturer Dupont DOW
0.24 g dry liquid 1

Once prepared, the mixture was spun in a piston spinning machine at 240° C. with a take-off speed of 250 m/min. The spun fibres were irradiated with a standard UV lamp to activate crosslinking. Subsequently, the gel content of the fibres was determined by heat extraction. The fibre sample had a gel content of 64%. Crosslinking was also demonstrated with rheological measurements. The starter polymer used also did not yield a higher gel content with other crosslinking processes. It may therefore be concluded that optimal crosslinking was achieved due to the use of dry liquid 1.

The invention claimed is:

1. A dry liquid, comprising:
   at least one additive having a molar mass greater than 20 g/mol, a melting temperature lower than 500° C., and a boiling temperature, measured at 101325 Pa, higher than 100° C., and
   at least one plate-like calcium carbonate as a carrier material, wherein:
   the at least one plate-like calcium carbonate is a precipitated calcium carbonate and has an oil number greater than 50 g/100 g of the at least one plate-like calcium carbonate,
   the at least one plate-like calcium carbonate comprises a calcitic calcium carbonate,
   the at least one plate-like calcium carbonate has a specific surface area (BET) ranging from 5 $m^2/g$ to 20 $m^2/g$,
   a fraction of the calcitic calcium carbonate is greater than 50% by weight relative to a total weight of the at least one plate-like calcium carbonate, and
   the dry liquid contains, relative to a total weight of the dry liquid:
      10.0% by weight to 90.0% by weight of the at least one additive, and
      90.0% by weight to 10% by weight of the at least one plate-like calcium carbonate, wherein a sum of fractions of the at least one additive and the at least one plate-like calcium carbonate is equal to at least 75.0% by weight.

2. The dry liquid according to claim 1, wherein the at least one additive has a molar mass greater than 75 g/mol and a boiling temperature, measured at 101325 Pa, higher than 150° C.

3. The dry liquid according to claim 1, wherein the at least one additive has a dynamic viscosity, measured at 25° C. and a shear rate of 100 Hz, lower than $10^6$ mPas.

4. The dry liquid according to claim 1, wherein the at least one plate-like calcium carbonate has a specific surface area (BET) ranging from 10 $m^2/g$ to 20 $m^2/g$.

5. The dry liquid according to claim 1, wherein the at least one plate-like calcium carbonate has a total intrusion volume greater than 1.0 $cm^3/g$.

6. The dry liquid according to claim 1, wherein the at least one plate-like calcium carbonate has a $d_{50\%}$ particle size larger than 0.2 µm.

7. The dry liquid according to claim 1, wherein the at least one plate-like calcium carbonate has an oil number greater than 60 g/100 g calcium carbonate.

8. The dry liquid according to claim 1, wherein the at least one plate-like calcium carbonate has a tapped density less than 1.0 g/ml.

9. The dry liquid according to claim 1, wherein the at least one plate-like calcium carbonate has a ratio of particle length to particle thickness greater than 5.

10. The dry liquid according to claim 1, wherein the at least one additive comprises at least one member of the group consisting of liquid silane, process oil, catalyst, crosslinking agent, plasticizer, flame retardant, and liquid plastic.

11. The dry liquid according to claim 1, wherein the at least one plate-like calcium carbonate has a total intrusion volume greater than 2.0 $cm^3/g$.

12. The dry liquid according to claim 1, wherein the at least one plate-like calcium carbonate has a tapped density less than 0.5 g/ml.

13. The dry liquid according to claim 1, wherein the at least one plate-like calcium carbonate has a specific surface area (BET) ranging from 10 $m^2/g$ to 20 $m^2/g$, a total intrusion volume greater than 2.0 $cm^3/g$, and a tapped density less than 0.5 g/ml.

14. A process for producing a dry liquid according to claim 1, comprising:
   dissolving the at least one additive in a solvent to form a solution,
   mixing the solution with the at least one plate-like calcium carbonate, and
   removing the solvent to produce a dry liquid.

15. A dry liquid, comprising:
   at least one additive having a molar mass greater than 20 g/mol, a melting temperature lower than 500° C., and a boiling temperature, measured at 101325 Pa, higher than 100° C., and
   at least one plate-like calcium carbonate as a carrier material, wherein:
   the at least one plate-like calcium carbonate is a precipitated calcium carbonate and has an oil number greater than 50 g/100 g of the at least one plate-like calcium carbonate,
   the at least one plate-like calcium carbonate comprises a calcitic calcium carbonate,
   the at least one plate-like calcium carbonate has a specific surface area (BET) ranging from 10 $m^2/g$ to 30 $m^2/g$,
   a fraction of the calcitic calcium carbonate is greater than 50% by weight relative to a total weight of the at least one plate-like calcium carbonate, and
   the dry liquid contains, relative to a total weight of the dry liquid:
      10.0% by weight to 90.0% by weight of the at least one additive, and
      90.0% by weight to 10% by weight of the at least one plate-like calcium carbonate, wherein a sum of fractions of the at least one additive and the at least one plate-like calcium carbonate is equal to at least 75.0% by weight.

16. A process for producing a dry liquid, said dry liquid comprising at least one additive having a molar mass greater than 20 g/mol, a melting temperature lower than 500° C., and a boiling temperature, measured at 101325 Pa, higher than 100° C., and at least one plate-like calcium carbonate as a carrier material, wherein the at least one plate-like calcium carbonate is a precipitated calcium carbonate and has an oil number greater than 50 g/100 g of the at least one plate-like calcium carbonate, wherein the at least one plate-like calcium carbonate has a specific surface area (BET) ranging from 5 $m^2/g$ to 20 $m^2/g$, wherein the at least one plate-like calcium carbonate comprises a calcitic calcium carbonate, wherein a fraction of the calcitic calcium carbonate is greater than 50% by weight relative to a total weight of the at least one plate-like calcium carbonate, and wherein the dry liquid contains, relative to a total weight of the dry liquid:
   10.0% by weight to 90.0% by weight of the at least one additive, and
   90.0% by weight to 10% by weight of the at least one plate-like calcium carbonate, wherein a sum of fractions of the at least one additive and the at least one plate-like calcium carbonate is equal to at least 75.0% by weight,
   said process comprising mixing the at least one additive and the at least one plate-like calcium carbonate directly to produce the dry liquid, without the use of solvents or other additives that must be removed from the dry liquid so produced.

* * * * *